April 10, 1934.         J. L. DELPINI ET AL         1,954,404
                    PLATFORM OF PASSENGER CARS
                        Filed Nov. 25, 1929
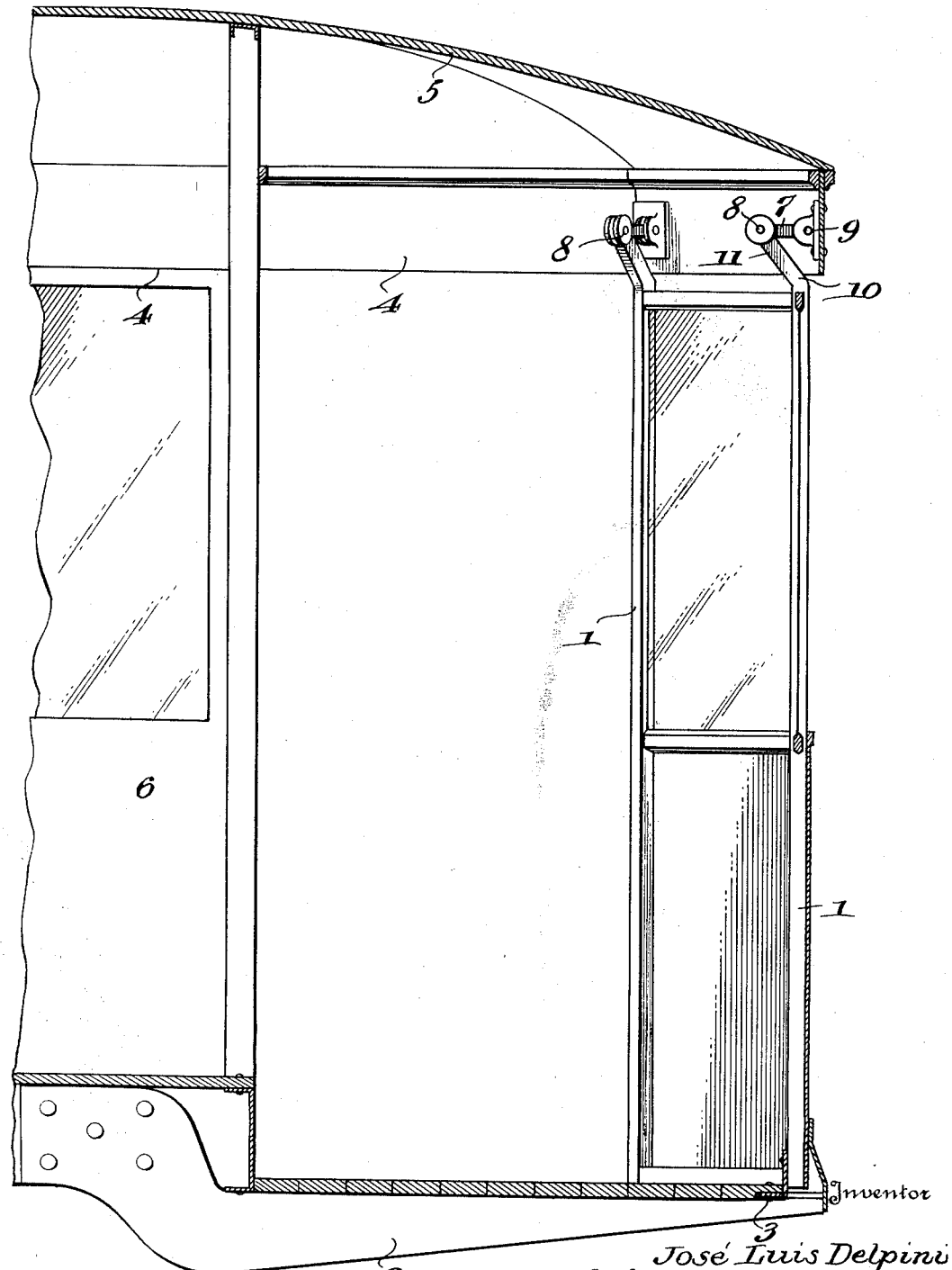
Inventor
José Luis Delpini
and
José Taraborrelli
By
Attorney Patented Apr. 10, 1934

1,954,404

UNITED STATES PATENT OFFICE 1,954,404

PLATFORM OF PASSENGER CARS

Jose Luis Delpini and José Taraborrelli, Buenos Aires, Argentina

Application November 25, 1929, Serial No. 409,704

3 Claims. (Cl. 105—425)

Our present invention relates to certain improvements in the platforms or similar portions of passenger cars, buses and the like, its object being to provide an improved construction thereof which shows many practical and other advantages over those used and proposed heretofore.

Experience has shown that the ordinary construction of closed platforms (with window-shutters) of passenger vehicles, is deficient and of precarious durability, since the roof of the platform is as a rule a solid construction of the box or body of the coach, being, consequently, a prolongation of the roof the said body-work; and at the same time it is constructed solidly supported by the platform part of the chassis. Therefore it results that the deformations of the projecting part of the end of the chassis which is the said platform chassis, are transmitted direct by the vertical back supports to the roof of the platform, or, say, the prolongation of the roof the coach. As the deformations of the end of the chassis are not conincident with those of the platform roof, it is obvious that this latter roof is subject to constant oscillating forces which produce inevitable breakage at the points where it is fastened to the body of the car.

In order to completely eradicate these inconveniences, we have arranged to separate the vertical struts of the platform from the roof, or join these struts to the roof by means of a swivel or hinge arrangement. The results are obvious; the independency thus established impedes the transmission of the deformations of the end of the chashis to the roof the platform.

Naturally, this improvement is also applicable to the front platform of the vehicles of the window-shutter type, but the front cabin-boxes for conductors are excluded from this invention.

Besides, the swivels or hinges can be fitted to the lower part of the struts, or at any point which is considered convenient in practice.

A constructive example is shown in the figure of the drawing attached hereto.

In the embodiment of our invention shown, the struts 1 which are fixed to the chassis or supporting beam 2 of the platform by means of the angle irons 3 connect said chassis to the platform roof 5 by means of an arrangement according to our invention, securing said struts to the beam or chassis 4 of said roof. It will be noted that this roof 5, as in usual constructions, is an extension of the body portion 6 of the car. To adapt the connection between the struts 1 and the beam 4 to accommodate the deformations which take place in the chassis 2 without transferring said deformations to the roof 5, we bend the upper ends 11 of the struts 1 inwardly, as indicated at 10, and provide their ends as shown at 8 with journals in which are swivelly mounted links or hinges 7. These links 7 extend substantially horizontally to swivelly engage at their other ends with the chassis 4 of the roof or brackets secured to said chassis as indicated at 9.

It is of course obvious that the connection may be effected not only between the struts 1 and the beam 4 but may be provided between the struts 1 and any suitable point on the platform closing structure from which the strut is a part.

From the foregoing description, the operation of our device is easily understood. Upon upward or downward displacement of the struts 1 incident to deformations in the chassis 2 when the car is in use, the upper ends of said struts will move in an arc about their swivel connection 9 with the beam 4 to accommodate these vertical movements without disturbance of the normal position of said beams 4 and the roof which they support.

It is thus seen that we have provided a means for interconnecting the platform chassis and the roof chassis that will permit independent relative motions therebetween and thus save the same from deterioration and wear which might be caused by their action upon one another during use.

We claim:

1. In a vehicle body, a platform or floor member, a roof member, a vertical strut between the members, a link for one end of the strut and one of said members, and a pivotal connection on said last-mentioned member and the said end of the strut and on the ends of the link pivotally connecting one end of the link to said last-mentioned member and the other end of the link to the strut to permit vertical motions and vibrations of the strut relative to said last-mentioned member.

2. In a vehicle body according to claim 1, in which the pivotal connections are provided on the roof member and on the upper end of the strut.

3. In a vehicle body according to claim 1, in which the end of the strut on which its pivotal connection is provided is bent to permit greater movement of the strut and a wider range of movement of the link.

JOSE LUIS DELPINI.
JOSÉ TARABORRELLI.